US008561271B2

(12) United States Patent  (10) Patent No.: US 8,561,271 B2
Chai et al.  (45) Date of Patent: Oct. 22, 2013

(54) METHODS FOR MANUFACTURE A CAPACITOR WITH THREE-DIMENSIONAL HIGH SURFACE AREA ELECTRODES

(76) Inventors: Liang Chai, Stuart, FL (US); Alan Rae, Wilson, NY (US); James M Wison, North Adams, MA (US)

( * ) Notice: Subject to any disclaimer, the term of this patent is extended or adjusted under 35 U.S.C. 154(b) by 245 days.

(21) Appl. No.: 12/969,186

(22) Filed: Dec. 15, 2010

(65) Prior Publication Data
US 2011/0310528 A1   Dec. 22, 2011

Related U.S. Application Data

(60) Provisional application No. 61/313,810, filed on Mar. 15, 2010, provisional application No. 61/287,135, filed on Dec. 16, 2009.

(51) Int. Cl.
*H01G 4/10* (2006.01)
(52) U.S. Cl.
USPC ............... 29/25.42; 29/25.41; 361/321.4
(58) Field of Classification Search
USPC ........ 29/25.35–25.42; 361/321.2–321.4, 311, 361/323, 508; 427/79, 58, 561
See application file for complete search history.

(56) References Cited

U.S. PATENT DOCUMENTS

| | | | | |
|---|---|---|---|---|
| 4,063,341 | A | * | 12/1977 | Bouchard et al. ............ 29/25.42 |
| 4,228,482 | A | * | 10/1980 | Bouchard et al. .......... 361/321.4 |
| 4,880,170 | A | | 11/1989 | Kemp et al. |
| 5,086,021 | A | * | 2/1992 | Sasaki et al. ................. 501/137 |
| 5,155,072 | A | * | 10/1992 | Bruno et al. .................. 501/138 |
| 5,534,290 | A | * | 7/1996 | Rainwater et al. ............. 427/79 |
| 6,300,267 | B1 | * | 10/2001 | Chen et al. .................... 501/135 |
| 6,362,947 | B1 | | 3/2002 | Chazno |
| 6,395,332 | B1 | | 5/2002 | Hanawa et al. |
| 6,404,616 | B2 | | 6/2002 | Mizuno |
| 6,409,776 | B1 | | 6/2002 | Yan et al. |
| 6,436,862 | B1 | | 8/2002 | Hirota et al. |
| 6,514,603 | B2 | | 2/2003 | Chazno |
| 6,525,921 | B1 | | 2/2003 | Nakatani et al. |
| 6,618,238 | B2 | | 9/2003 | Sanville, Jr. |
| 6,780,494 | B2 | | 8/2004 | Kobayashi et al. |
| 6,795,295 | B2 | | 9/2004 | Murakami et al. |
| 6,906,906 | B2 | | 6/2005 | Hattori |
| 6,972,473 | B2 | | 12/2005 | Beroz |

(Continued)

OTHER PUBLICATIONS

Molberg et al., High Breakdown Field Dielectric Elastomer Actuators Using Encapsulated Polyaniline as High Dielectric Constant Filler, Advanced Functional Materials 2010, pp. 3280-3291.

Shen et al., High Dielectric Performance of Polymer Composite Films Induced by a Percolating Interparticle Barrier Layer, Advanced Materials 2007, pp. 1418-1422.

(Continued)

*Primary Examiner* — Minh Trinh
(74) *Attorney, Agent, or Firm* — Smith Risley; Steven P. Wigmore (57) ABSTRACT

A method for making a capacitor having improved capacitance efficiency which results from increasing the effective area of an electrode surface is disclosed. Specifically, an improved "three-dimensional" capacitor may be constructed with electrode layers having three-dimensional aspects at the point of interface with a dielectric such that portions of the electrode extend into the dielectric layer. Advantageously, embodiments of a three-dimensional capacitor drastically reduce the space footprint that is required in a circuit to accommodate the capacitor, when compared to current capacitor designs. Increased capacitance density may be realized without using high k (high constant) dielectric materials, additional "electrode-dielectric-electrode" arrangements in an ever increasing stack, or serially stringing together multiple capacitors.

4 Claims, 10 Drawing Sheets

(56) References Cited

U.S. PATENT DOCUMENTS

| | | | |
|---|---|---|---|
| 6,977,806 | B1 | 12/2005 | Sakashita |
| 7,131,174 | B2 | 11/2006 | Kobayashi et al. |
| 7,457,104 | B2 | 11/2008 | Lee et al. |
| 7,495,891 | B2 | 2/2009 | Lee et al. |
| 7,594,937 | B2 | 9/2009 | Amita et al. |
| 7,609,504 | B2 | 10/2009 | Park et al. |
| 7,621,976 | B2 * | 11/2009 | Hampden-Smith et al. .... 75/338 |
| 7,732,002 | B2 * | 6/2010 | Kodas et al. ................... 427/58 |
| 7,903,387 | B2 | 3/2011 | Masuda et al. |
| 2003/0116348 | A1 | 6/2003 | Nakatani et al. |
| 2004/0012913 | A1 | 1/2004 | Andelman |
| 2004/0233613 | A1 | 11/2004 | Kasahara et al. |
| 2006/0087795 | A1 | 4/2006 | Nagasawa et al. |
| 2008/0198533 | A1 | 8/2008 | Lee et al. |
| 2008/0239620 | A1 | 10/2008 | Min et al. |
| 2009/0103248 | A1 | 4/2009 | Lin |
| 2010/0110608 | A1 | 5/2010 | Wei et al. |
| 2010/0283122 | A1 | 11/2010 | Pulugurtha et al. |
| 2011/0310528 | A1 * | 12/2011 | Chai et al. .................. 361/321.1 |
| 2012/0262836 | A1 * | 10/2012 | Chai ......................... 361/301.4 |

OTHER PUBLICATIONS

Zois et al., Structure and Dielectric Properties of Thermoplastic Blend Containing Dispersed Metal, Macromolecular Symposium 2003, pp. 461-472.

Sumesh et al., Three-phase polymer-ceramic-metal composite for embedded capacitor applications, Composites Science and Technology 69 (2009), pp. 1298-1302.

Xu et al., A Novel Aluminum-Filled Composite Dielectric for Embedded Passive Applications, IEEE Transactions on Advanced Packaging, vol. 29. No. 2, May 2006, pp. 295-306.

Zois et al., Dielectric Properties and Morphology of Polymer Composites Filled with Dispersed Iron, Journal of Applied Polymer Science, vol. 88, pp. 3013-3020 (2003).

McQueen et al., Multiple threshold percolation in polymer/filler composites, J. Phys. D: Applied Physics 37 (2004), pp. 2160-2169.

Moya et al., The challenge of ceramic/metal microcomposites and nanocomposites, Progress in Materials Science 52 (2007), pp. 1017-1090.

PCT International Prelimnary Report on Patentability, mailed Apr. 25, 2013 for PCT Application Serial No. PCT/US2011/055760 filed on Oct. 11, 2011—nine sheets.

* cited by examiner

METHODS FOR MANUFACTURE A CAPACITOR WITH THREE-DIMENSIONAL HIGH SURFACE AREA ELECTRODES

CROSS-REFERENCE TO RELATED APPLICATIONS

Priority under 35 U.S.C. §119(e) is claimed to each of two U.S. provisional applications which are both entitled "THREE DIMENSIONAL CAPACITOR," filed on Dec. 16, 2009 and Mar. 15, 2010 and assigned application Ser. Nos. 61/287,135 and 61/313,810, respectively. The entire contents of these applications are hereby incorporated by reference.

BACKGROUND

A capacitor is any device having the principal electric property of capacitance, i.e. the ability to store an electric charge. In the field of electronics, the ability of a capacitor to store an electric charge is useful in controlling the flow of an electric current. Moreover, capacitors may be employed in circuits for the purpose of filtering electrical signals; for example, a capacitor with variable capacitance can be used in the tuning circuit of a radio or television receiver. Varying the capacitance changes the resonant frequency of the tuner circuit so that it matches the frequency of the desired station or channel, filtering out signals of all unwanted frequencies.

The simplest of capacitors will comprise two plates of a conductive material separated from one another by an insulator, also referred to as a dielectric, with each plate connected to a terminal. When voltage is placed across the terminals of an uncharged capacitor, charge flows to each of the plates (positive charge to the anode plate and negative charge to the cathode plate) but not across the insulator sandwiched between. As the opposite charges increase on the conductive anode and cathode plates, the force on the dielectric between them also increases, thereby causing the electric field across the dielectric to increase. This phenomenon gives rise to a voltage which increases proportionally with the charge on the plates.

The ratio of the charge magnitude on each plate to the electric potential (voltage) between the plates is the aforementioned capacitance and approximates the externally applied voltage source used to charge the capacitor. When these two voltages have the same magnitude (the voltage source and the capacitor), the current ceases to flow and the capacitor is considered to be charged. A charged capacitor is subsequently discharged by reducing the external voltage through an applied electrical load, thus causing a decrease in the voltage across the plates when a produced current quickly flows the charge off the plates.

There are many types of capacitors, each varying in construction and material combinations, but the physics explained above are essentially the same for all. A common capacitor type employs ceramic for the dielectric layer and may take either a cylindrical structure, wherein a hollow cylinder of the ceramic material is lined with thin films of conductive metal on its inner and outer surfaces, or a flat, parallel plate structure wherein a plurality of plates of ceramic and conductive materials are interleaved to create the sandwiched "electrode-dielectric-electrode" arrangement.

Manufacturing is fairly straightforward for capacitors comprised of the so-called parallel plate structure. A layer of dielectric is sandwiched between two conductive electrode layers, wherein capacitance of the resulting parallel plate capacitor is a function of the overlapped area of the electrode plates, thickness of the dielectric layer, and the permittivity of the dielectric.

A multi-layer ceramic capacitor (MLCC) is a parallel plate capacitor having a plurality of stacked "electrode-dielectric-electrode" arrangements (EDE) that each may form a tri-layer. The capacitance of a MLCC may be drastically increased by the parallel connection of the many parallel plates. Quite simply, more stacked arrangements increases capacitance and forms a MLCC. Similarly, individual capacitors can also be connected in series, essentially spreading the above described MLCC over a larger surface area as opposed to a higher amount of head room.

An advantage of serially connected capacitors over a highly stacked MLCC is that the serial arrangement is known in the art to exhibit better resistance to voltage breakdown (as the charge and voltage on a given capacitor are increased, at some point the dielectric will no longer be able to insulate the charges from each other, subsequently exhibiting dielectric breakdown, or high conductivity in some areas, which tends to lower the stored energy and charge, generating internal heat).

Turning back to the manufacturing methods employed to make typical MLCCs, a capacitor may be made by applying a dielectric slurry, such as a ceramic based slurry, between alternating pairs of conductive plates. However, the manufacturing of MLCCs has largely migrated to the use of a conductive ink or paste (an ink or paste comprising a conductive material such as, for example, silver), in lieu of plates; This ink or paste may be screen-printed over a "green tape" of a dielectric slurry which was previously cast on a carrier polymer film. Consistent with what has been described above, many layers of interleaved dielectric tapes and electrode applications can be stacked and laminated together to form a final MLCC product.

Multi-layer ceramic capacitors with about 500 to about 1000 layers, where the dielectric layers often being less than about 1 micron thickness, are achievable. Reduction in layer thickness in a MLCC directly correlates with saved head room, however, it is often not the headroom that comes at a premium. In actuality, the overall surface area required to accommodate a passive electrical component, such as a MLCC, represents valuable real estate in an electrical circuit.

To reduce the space passive components occupy using surface mount technology, 0402 size (about 0.04 inch by about 0.02 inch) is gaining momentum as the most popular and even 0201 (about 0.02 inch by about 0.01 inch) can be reliably produced. Generally speaking, when holding capacitance constant, the smaller the MLCC is, the better. However, there is a limit to simply reducing the area footprint and increasing layer quantities as continued reduction in the thickness of dielectric and electrode layers can create manufacturing problems. Therefore, there is a need to provide alternate methods to continue the trend to reduce the size and increase the capacitance density of the ceramic capacitor.

BRIEF SUMMARY

The presently disclosed embodiments, as well as features and aspects thereof, are directed towards providing a capacitor, and methods of manufacture, having improved capacitance efficiency which results from increasing the effective area of an electrode surface. More specifically, an improved "three-dimensional" capacitor may be constructed with electrode layers having three-dimensional aspects at the point of interface with a dielectric such that portions of the electrode extend or protrude into the dielectric layer. Advantageously, embodiments of a three-dimensional capacitor drastically reduce the space footprint that is required in a circuit to accommodate the capacitor, when compared to current capacitor designs known in the art, as increased capacitance can be realized without adding additional "electrode-dielectric-electrode" tri-layer arrangements in an ever increasing stack or serially stringing together multiple capacitors.

Notably, exemplary three-dimensional capacitors described in, or incorporated into, the present specification are generally directed toward capacitors comprised of ceramic based dielectrics, however, it will be understood that the present disclosure is not limited to capacitors which comprise ceramic based dielectrics. That is, it is anticipated that features and aspects of a three-dimensional capacitor, and the various methods of manufacture, can be employed in three-dimensional capacitors that do not necessarily comprise ceramic components and, as such, the present disclosure will not be interpreted such that the scope of a three-dimensional capacitor is limited to the field of ceramic capacitors.

The capacitance efficiency of a capacitor, in lieu of simply stacking more plates, can be increased via modification of the individual conductive plate geometry and the nature of the dielectric in a three-dimensional capacitor. More specifically, as surface area of an electrode plate may be increased via undulations, protrusions, extensions or other aspects that are in contact with the dielectric layer, an increased number of charged particles can be realized, thus increasing the capacitance of the three-dimensional capacitor without increasing the overall space footprint required to accommodate the capacitor in a circuit.

DETAILED DESCRIPTION

The presently disclosed embodiments, as well as features and aspects thereof, are directed towards providing a capacitor, and methods of manufacture, for improving capacitance efficiency which results from increasing the effective area of an electrode surface. More specifically, an improved "three-dimensional" capacitor may be constructed with electrode layers having three-dimensional aspects at the point of interface with a dielectric. Advantageously, embodiments of a three-dimensional capacitor drastically reduce the space footprint that is required in a circuit to accommodate the capacitor, when compared to current capacitor designs known to one of ordinary skill in the art. Increased capacitance density can be realized without necessarily requiring high k (high constant) dielectric materials, additional "electrode-dielectric-electrode" arrangements in an ever increasing stack, or serially stringing together multiple capacitors.

Exemplary embodiments of a three-dimensional capacitor are disclosed herein in the context of ceramic based capacitors, however, one of ordinary skill in the art will understand that various embodiments of a three-dimensional capacitor may not necessarily comprise ceramic based components and, as such, the scope of the present disclosure will not be limited to ceramic based embodiments. Moreover, the dielectric, anode and cathode layers of the disclosed embodiments may at times be generally referred to herein as "plates" or "layers." However, the present disclosure shall not be interpreted such that the conductive or dielectric layers must be "rigid" or "stiff" plates in all embodiments of a three-dimensional capacitor. Rather, the term "plate," as taken in context with a particular exemplary embodiment being conveyed, will be understood to include any component layer, or method of creation thereof, including rigid plates or plates created from the application of inks, paste, mechanics of deformable bodies, etc. That is, it will be understood that the term "plate" simply refers to a particular layer within a three-dimensional capacitor, such layer limited only by the features and aspects that may be described relative to the disclosure of the exemplary embodiments with which it is associated.

Generally, the particular embodiments described in the present disclosure are offered for illustrative purposes only and will not be construed to limit the scope of a three-dimensional capacitor. Moreover, while various embodiments of a three-dimensional capacitor may utilize different component or material choices, the exemplary materials described relative to the illustrative embodiments in the present disclosure are not intended as a comprehensive listing of materials or components that may be comprised within a three-dimensional capacitor. Materials used to create a three-dimensional capacitor and, in particular, the features of a three-dimensional capacitor such as the anode layer, cathode layer, terminals, conductive protrusions, dielectric or "green tape" layer, vary according to embodiment and, although perhaps serving to generate a novel feature or aspect of a certain embodiment, will not limit the scope of the disclosure.

Material choices for the various components or features of a given three-dimensional capacitor include, but are not limited to: for the electrodes—silver (about 100% percent by weight), silver palladium alloy (such as about 95% Ag to about 5% palladium percent by weight), palladium, and other precious metals such as, but not limited to, gold, platinum, iridium, and their alloys, as well as refractory metals such as, but not limited to, tungsten, molybdenum, tantalum, niobium, hafnium, and rhenium, and base metals such as, but not limited to, nickel, nickel alloy, copper and copper alloys; for the dielectric layer: ceramic and glass-ceramic, precious metal coated ceramics such as, but not limited to, silver-coated ceramics, palladium-coated ceramics, silver palladium coated ceramics, etc. as well as silver coated formulated barium titanate based dielectrics, silver coated glass beads, and inorganic oxides such as, but not limited to, alumina and tantalum oxide.

Turning now to the figures, where like reference numerals represent like elements throughout the drawings, various aspects, features and embodiments of exemplary three-dimensional capacitors and methods of manufacture will be presented in more detail. The examples as set forth in the drawings and detailed description are provided by way of explanation and are not meant as limitations on the scope of a three-dimensional capacitor, the methods for making a three-dimensional capacitor or the specific materials of construction that may be comprised within a three-dimensional capacitor. A three-dimensional capacitor thus includes any modifications and variations of the following examples that are within the scope of the appended claims and their equivalents as understood to one of ordinary skill in the art.

According to exemplary embodiments of a three-dimensional capacitor, by using metal coated ceramic particles in place of uncoated ceramic particles in the dielectric layer, a modified manufacturing process can be used to create a three-dimensional capacitor embodiment. Coated dielectric material selection may be merged with an improved manufacturing method to render a three-dimensional capacitor embodiment.

Some embodiments of a three-dimensional capacitor include multi-layer ceramic capacitors (MLCC) or the like and, therefore, it will be understood that many of the embodiments of three-dimensional capacitor that are described and depicted in the present disclosure are intended to only represent a single "electrode-dielectric-electrode" arrangement (EDE) that may represent a single tri-layer within a MLCC.

Figure 1:
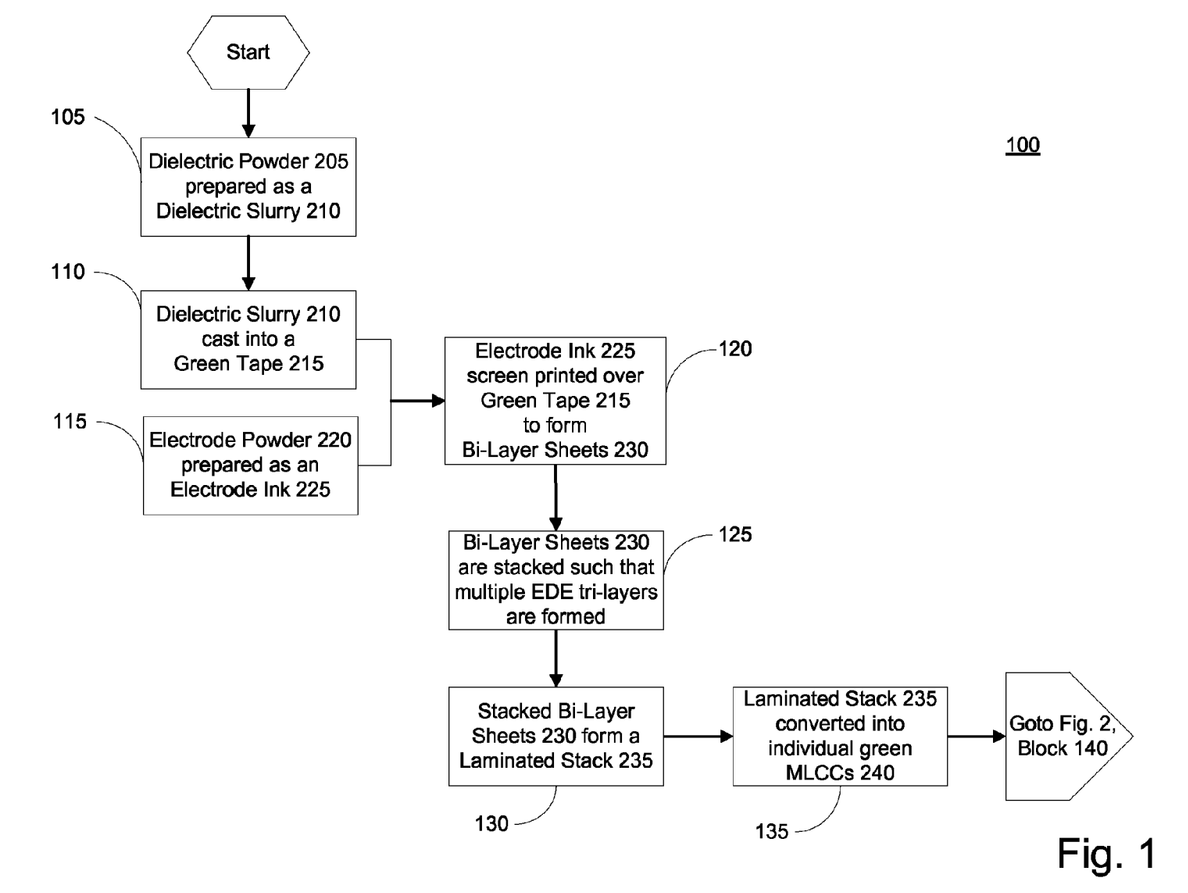
FIGS. 1-2 collectively illustrate a modified manufacturing process that may be used to generate a three-dimensional multi-layer ceramic capacitor having EDE tri-layers.
Figure 2:
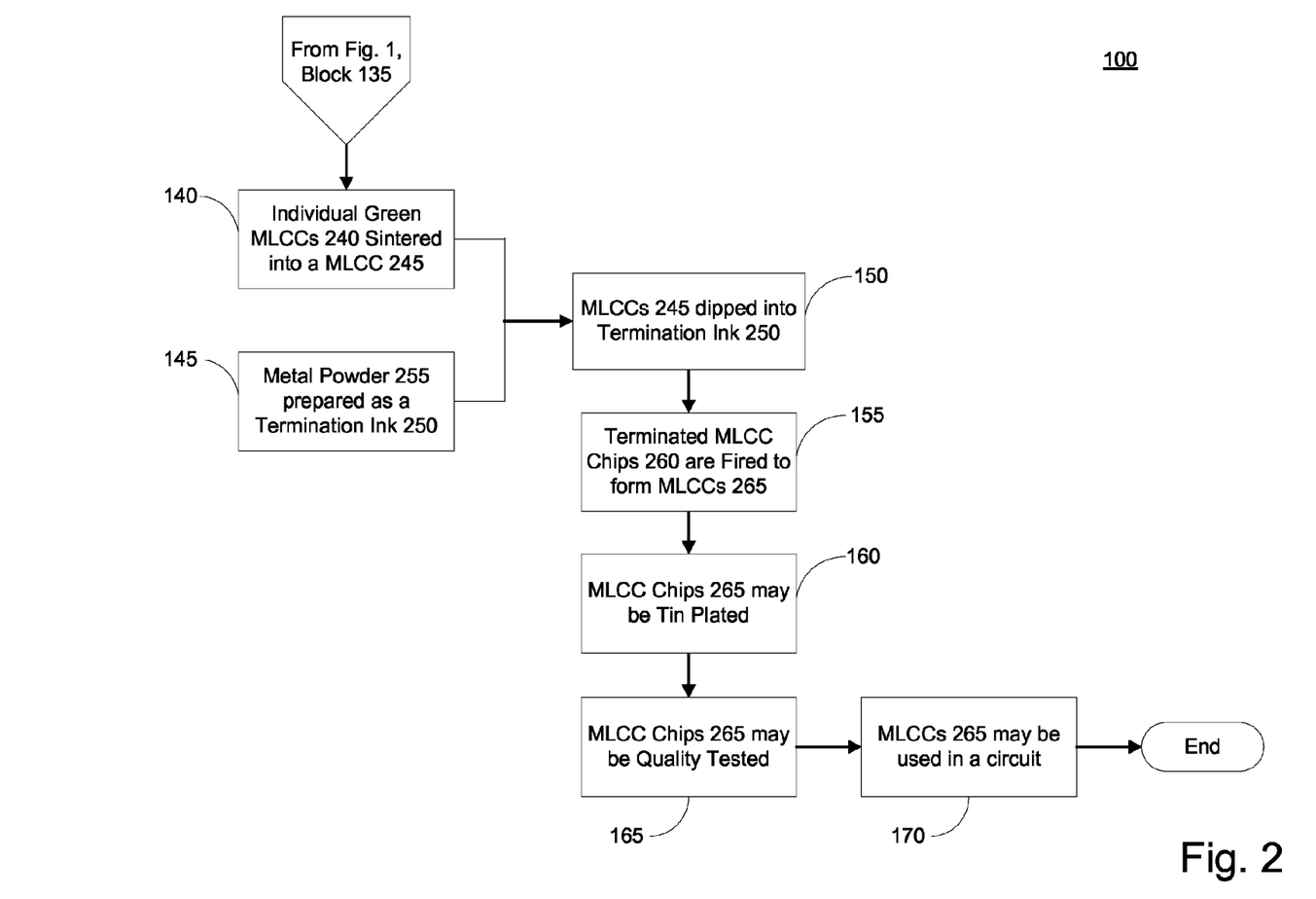

FIGS. 1-2 collectively illustrate one exemplary manufacturing process 100 that may be used to generate a MLCC having EDE tri-layers according to an exemplary embodiment of the invention. Referring to FIG. 1, in the manufacturing process for a MLCC, a ceramic powder 205 is mixed (step 105) into a carrier such as, but not limited to, a compound which may contain a solvent, polymer resin and additives such as a dispersing agent, to form a ceramic slurry 210. The ceramic slurry 210 is used to cast the "green ceramic tape" 215 in the tape casting step 110 of the process. The green tape 215, having been made from the ceramic powder slurry, will eventually function as a dielectric layer of a capacitor. Although the exemplary green tape is described above as being formed from a ceramic slurry, it will be understood that embodiments of the invention may include green tape components made from materials other than, or in addition to, ceramics such as, but not limited to, formulated barium titanate based dielectrics, glass ceramics such as, but not limited to, Ca—B—Si—O system glass ceramics used in low-temperature co-fired ceramics, and alumina glass ceramics used in high-temperature co-fired ceramics and various metal coated ceramics and inorganic oxides and compounds. The metal used for coating or mixing can include, but is not limited to, silver-palladium alloys (such as the percent by weight composition of silver palladium in the range of about 95% Ag and about 5% Pd, more preferably about 90% Ag and about 10% Pd, and most preferably about 70% Ag and about 30% Pd) as well as palladium, palladium alloys, platinum, platinum alloys, silver, silver alloys, gold, gold alloys and other precious metals and their respective alloys, such as, iridium, Rhodium, ruthenium, as well as base metals, such as, but not limited to, copper, nickel, iron, cobalt, manganese, titanium, zinc, and refractory metals such as, but not limited to, tungsten, molybdenum, zirconium, tantalum, and niobium.

Surface texturing of the green tape may also be made using a mechanical roller. For example, after rolling on top of the green tape, the texture on the roller may be transferred onto the green tape. Later, once cast, the green tape 215 advances in the exemplary process to be screen printed at step 120.

Prior to screen printing at step 120, an electrode metal powder 220 is mixed (step 115) with a carrier compound to form electrode ink 225. The electrode ink 225 is screen printed (step 120) onto the ceramic green tape 215 to form a single dielectric-conductive bi-layer of an eventual MLCC. As steps 105 through 120 are repeated, the multiple screen printed green tape sheets 230, each sheet comprising a single dielectric-conductive bi-layer, are stacked at step 125 such that EDE tri-layers are created via the repeated juxtaposition of a screen printed conductive layer with the bottom surface of the green tape of a subsequent sheet. The stack resulting from step 125 is laminated together at step 130 in a lamination process. The resulting laminated stack 235 is then converted at step 135 into individual ceramic green chips 240 comprised of multiple interleaved EDE tri-layers.

In FIG. 2, process 100 continues with the individual ceramic green chips 240 being exposed to a firing process at step 140. In the firing process (step 140), the green ceramic chips 240 may be sent through a belt furnace or the like to cause the organics in the aforementioned slurries to be removed, thereby sintering the green ceramic chip 240 into a ceramic capacitor chip 245 comprised of EDE tri-layers.

At step 150, the sintered ceramic capacitor chip 245 may then be metalized at each of two ends via dipping into a termination ink 250 that was mixed (step 145) from a conductive metal powder 255. The termination metallization provides internal connection between alternating conductive plates (anode to anode and cathode to cathode) as well as electrical contact points for circuit board applications. The terminated chips 260 are then dried and fired again at step 155 in a termination firing process to become a MLCC 265. Finally, at step 160, tin plating may be applied to the MLCCs 265 in a plating process to protect the termination metallization and provide for ease of soldering connections. As is known to one of ordinary skill in the art of manufacturing, the MLCCs 265 may then go through a testing process at step 165 for quality control prior to employment in a circuit (step 170).

Modified Manufacturing Process Coupled with Unique Component Selection

By using metal coated ceramic particles in place of the exemplary non-coated ceramic powder 205 described above, the modified ceramic capacitor manufacturing process 100 may be used to create three-dimensional capacitor embodiments.

Metal-coated ceramic powders featuring a continuous particulate coating such as, but not limited to, silver coated dielectrics are utilized in various embodiments of a three-dimensional MLCC. Silver coated glass beads are available as of this writing from Technic, Inc. of Woonsocket, R.I. and Potters Industries, Inc. of Malvern, Pa.

Typically, the metal coating of the metal-coated ceramic powder is consistent with the conductive powder that may be used to create an electrode layer such as, but not limited to, silver or silver-palladium alloy in the case of a precious metal MLCC and nickel or nickel alloys in the case of a base metal MLCC. In other embodiments, metal-coated ceramic powders having inconsistent, defective coatings can be employed. Moreover, although the particulate coating is substantially consistent in some metal-coated ceramic powders prior to the powder being incorporated into a given three-dimensional capacitor embodiment, defects in the continuity of the coating may occur during the process of mixing the metal coated ceramic particulates into pastes. Regardless of whether a coated particulate features a continuous, consistent coating or an inconsistent, defective coating, a coated particulate may be used to effectively form a dielectric layer of a three-dimensional capacitor embodiment.

Advantageously, because of the inherent surface tension between the metal coating and ceramic particulate substrate, discontinuity of the metal coating may occur as a result of exposure to a sintering temperature. One of ordinary skill in the art will understand that exposure of a metal-coated particulate to a given sintering temperature may cause the metal coating to flow from the particulate and aggregate in voids between neighboring particulate. The resulting aggregations of metal coating that has flowed from the surface of a dielectric particulate may settle into cavities between juxtaposed dielectric particulate and simultaneously contact an anode or cathode layer within the MLCC, thereby effectively creating a conductive extension of the anode or cathode layer that protrudes substantially perpendicularly from the electrode layer into the dielectric layer. Notably, and advantageously, multiple protrusions of aggregated metal coating serve to increase the capacitance density of the MLCC, without expanding the overall space footprint of the MLCC, by virtue of increasing the surface area attributable to the conductive layers. The thickness of the protrusion that may result from some aggregations of the metal coatings, after sintering, is believed to be between 1% and 90% of an overall particle thickness that ranges between about 0.001 microns and about 10 microns.

One of ordinary skill in the art will recognize that various manufacturing and material parameters can be leveraged to control the flow and aggregation of a conductive coating from a coated dielectric particulate and, therefore, even though particular process parameter setting combinations or material features may be novel, or render novel results, variations in process parameter settings or material features will not limit the scope of the present disclosure. Manufacturing parameters and material features that may be leveraged to affect the flow and aggregation of metal coating from metal-coated particulate include, but are not limited to, the metal coating percentage, the thickness of the dielectric layer, sintering temperature and sintering time.

Some embodiments of a three-dimensional capacitor may leverage dielectric material selection composed of core-shell ceramic particles. The core in a core-shell ceramic particle may have the composition of BaTiO3 while the shells may be rich in dopants to modify the temperature coefficients of the capacitance. The composition distribution (core-shell structure) may provide a consistent dielectric constant over the required temperature range.

Figure 3:
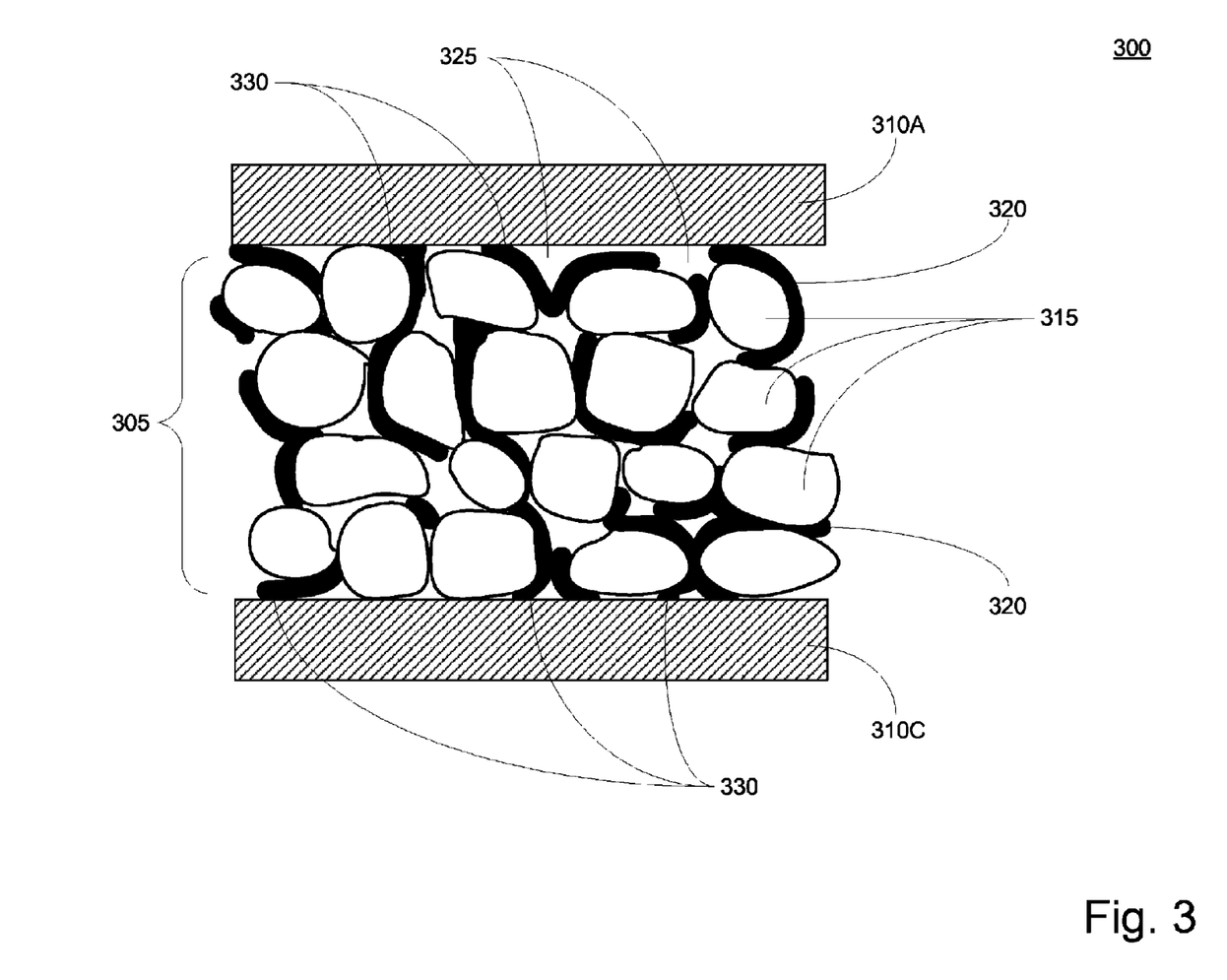
FIG. 3 illustrates a cross-sectional view of a single EDE tri-layer that forms one exemplary embodiment of a three-dimensional capacitor, wherein three-dimensional structures are formed from conductive coatings on dielectric particulates.

FIG. 3 illustrates a cross-sectional view of a single EDE tri-layer 300 that may form one exemplary embodiment of a three-dimensional capacitor, wherein three-dimensional structures (protrusions) are formed from conductive coatings on dielectric particulates. The dielectric layer 305 may comprise, for example, metal coated ceramic particles 315, wherein the conductive metal coating on the ceramic particulate may include, but is not limited to, silver-palladium alloys, palladium, palladium alloys, platinum, platinum alloys, silver, silver alloys, gold, gold alloys, etc. As a non-limiting example of embodiments that may include silver-palladium coating on dielectric particulate, the percent by weight composition of the silver-palladium coating may be in the range of about 95% Ag and about 5% Pd, more preferably about 90% Ag and about 10% Pd, and most preferably about 70% Ag and about 30% Pd.

The conductive metal coating on dielectric particulate used in some embodiments may include other precious metals and their respective alloys such as, but not limited to, iridium, Rhodium, and ruthenium. Additionally, some embodiments may include a particulate with a metal coating containing base metals such as, but not limited to, copper, nickel, iron, cobalt, manganese, titanium, zinc. Further, it is envisioned that still other embodiments may include dielectric particulate coated with refractory metals such as, but not limited to, tungsten, molybdenum, zirconium, tantalum, and niobium.

Moreover, although the exemplary dielectric layer 305 is described as being comprised of coated ceramic particles, it is also envisioned that the dielectric portion of coated particles in layer 305 may be comprised of dielectric matter other than ceramics such as, but not limited to, ceramic and glass-ceramic, precious metal coated ceramics such as, but not limited to, silver-coated ceramics, palladium-coated ceramics, silver palladium coated ceramics, etc. as well as silver coated formulated barium titanate based dielectrics, silver coated glass beads, and inorganic oxides such as, but not limited to, alumina and tantalum oxide. Also, while the metal coating 320 on the ceramic particles 315 may be substantially uniform (not shown) prior to creation of a dielectric green sheet, the metal coating 320 advantageously becomes discontinuous after sintering.

Dielectric layer 305 is depicted as the entire layer of ceramic particles 315 positioned between two electrode plates 310A, 310C. Notably, while plate 310A has been designated in the FIG. 3 illustration as representing the anode plate, and plate 310C as the cathode plate, one of ordinary skill in the art will understand that either conductive plate 310 could perform as the anode or the cathode in a charged capacitor, as an application may require. The ceramic particles of dielectric layer 305 typically range in size from about 0.01 to about 10 microns, but other dielectric particle size ranges are possible as understood by one of ordinary skill in the art.

As explained above, the discontinuity in the metal coating 320 after sintering of the ceramic chips is mainly due to the surface tension between the dissimilar materials of the coated dielectric particles 315, such as, but not limited to, metal and ceramic. Generally, after sintering temperature is reached, the temperature causes the metal coating 320 to flow and aggregate into cavities 325 between the dielectric ceramic particles 315. Advantageously, the aggregated metal 320 that results from the melted particulate coating will cool to form a plurality of three-dimensional structures or protrusions 320 extending or protruding substantially perpendicular down through the dielectric layer from either the anode 310A or cathode 310C plates. Many of the three-dimensional structures 320, which are comprised of conductive material, may form an interface structure 330 with either the anode 310A or cathode 310C plate of the EDE tri-layer 300. One of ordinary skill in the art will understand that the overall surface areas attributable to the conductive plates 310A, 310C may be effectively increased, with dielectric material dispersed all between the dielectric particles 315, thus increasing the overall capacitance density of the capacitor 300.

As a non-limiting example of capacitance density increase, embodiments of a three-dimensional capacitor have been estimated to have an increased capacity density of anywhere from about ten (10) times to about one thousand (1000) times over traditional capacitor designs. Even so, the above range of capacity density increase is offered for exemplary purposes only and will not be a limiting factor on the scope of the disclosure. One of ordinary skill in the art will recognize that a given three-dimensional capacitor embodiment may advantageously have an increased capacity density when compared to other capacity designs that require an equivalent, or nearly equivalent, space footprint in a circuit.

Importantly, one of ordinary skill in the art will understand that angles besides those which are substantially perpendicular to the dielectric 305 and conductive 310 layers are envisioned as a result of the aggregation of the dielectric particulate coating 315 and, as such, the above description of the three-dimensional structures 330 being substantially perpendicular to the various layers will not limit the scope of a three-dimensional capacitor 300. The three-dimensional structures 315, 320 that are formed both increase the overall surface area attributable to a given conductor plate and also essentially form a plurality of small micro-capacitor tri-layer arrangements within a given EDE tri-layer 300.

Metal-coated ceramic powders suitable for use in the dielectric layer 305 in order to create a three-dimensional capacitor 315, such as the exemplary embodiment described above, can be produced commercially. The innovative capacitor structure may include various dielectric particulate materials and coating combinations, although certain combinations may be more advantageous than others. Moreover, one of ordinary skill in the art will recognize that various parameters may be used to control aspects or properties of the three-dimensional structures in a three-dimensional capacitor such as, but not limited to, the selection of metal coating percentage, sintering temperature, and sintering time.

Figure 4:
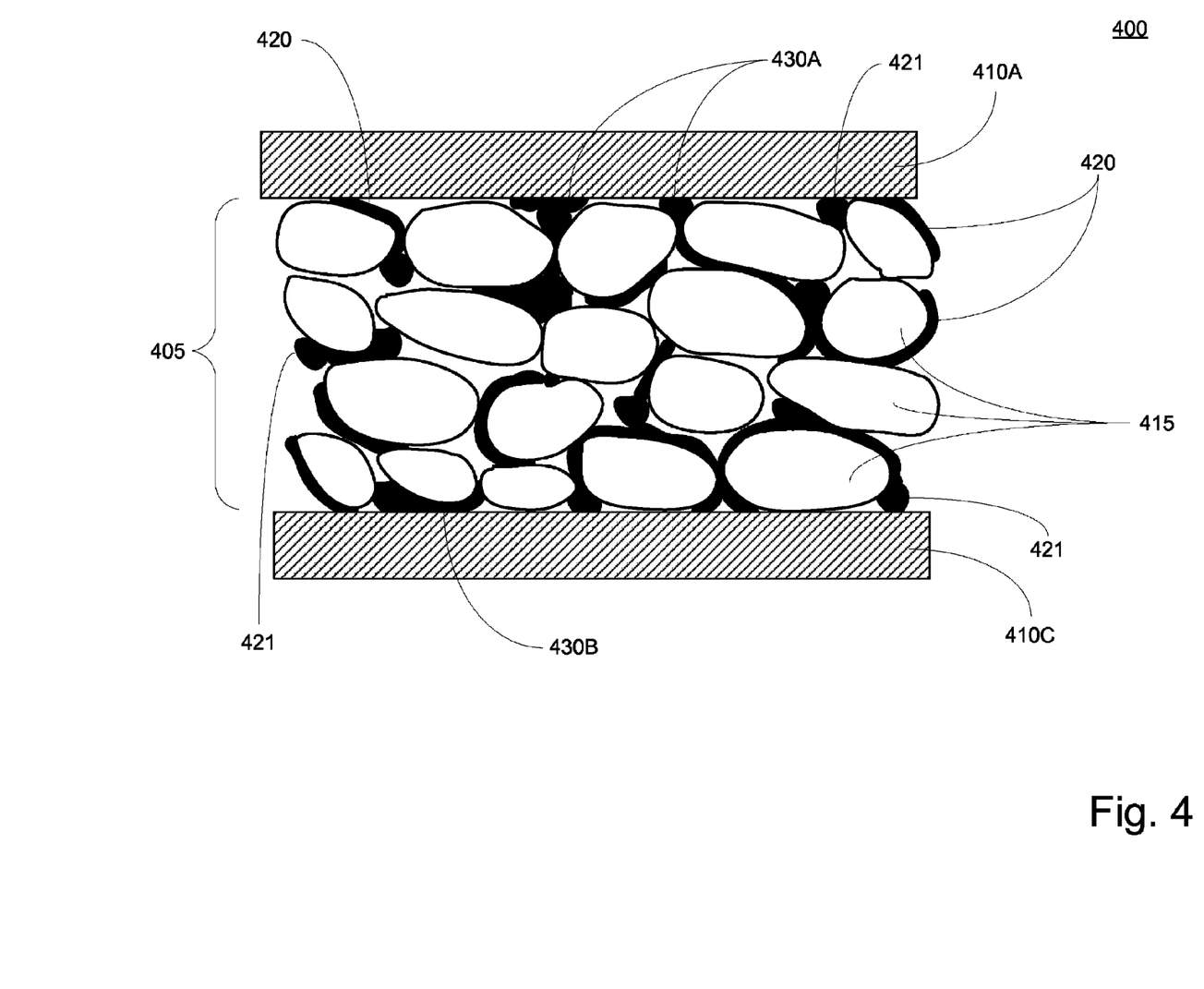
FIG. 4 illustrates a cross-sectional view of a single EDE layer that may form another exemplary embodiment of a three-dimensional capacitor, wherein three-dimensional structures are formed from metal particles mixed into the dielectric slurry of coated dielectric particles.

FIG. 4 illustrates a cross-sectional view of a single EDE layer 400 that forms one exemplary embodiment of a three-dimensional capacitor, wherein three-dimensional structures are formed from metal particles 421 mixed into the dielectric slurry of dielectric particles or coated dielectric particles. Consistent with step 120 of process 100 described above, the electrode plates 410A, 410C are printed over the green tape 215, 405, wherein the green tape 215, 405, instead of being made from a pure dielectric slurry 210, is made of a mixture of metal particulate 421 and dielectric particles or metal coated dielectric particulate 415. As described above relative to the FIG. 3 embodiment, it is envisioned that the metal coated dielectric particulate may be comprised of any combination of conductive coating and dielectric particulate and, as such, it will be understood that specific particulate and conductive coating material choices and combinations are offered herein for illustrative purposes and will not limit the scope of the disclosure. Similarly, it is envisioned that metal particulate 421 may be comprised of any suitable conductive material including, but not limited to, silver, silver palladium alloy, nickel, nickel alloys, copper, copper alloys, etc. The metal coating of the dielectric particles 415 may be discontinuous as a result from the mechanical mixing with the metal particulate 421, however, after sintering, the coating will generally flow and aggregate such that three-dimensional structures or protrusions 420 are formed substantially perpendicular to the dielectric layer, some forming on interface 430A with the top electrode and some forming on interface 430B and being connected to the bottom electrode, with metal particulate 421 aggregated throughout.

The manufacturing of the three-dimensional capacitor layer illustrated in FIG. 3 is essentially equivalent to that which was described relative to process 100. Again, to manufacture the three-dimensional capacitor of the exemplary embodiment illustrated in FIG. 3, modifications to the manufacturing process as described in connection with FIGS. 1-2 are usually made. Specifically, in step 105, if a metal coated dielectric 315 is used in place of the ceramic dielectric powder 205 in the MLCC production, the resulting three-dimensional capacitor will have structure similar to the FIG. 3 embodiment. Similarly, if the mechanical mixture of conductive particulate 421 and dielectric particles or coated dielectric particulate 415 is inserted in place of powder 205, the resultant three-dimensional capacitor will have structure similar to the FIG. 4 embodiment.

Unique Component Selection and Additional Manufacturing Steps

By incorporation of additional manufacturing steps to accommodate various novel component selections, a unique ceramic capacitor manufacturing process 100 may be used to create three-dimensional capacitors.

Figure 5:
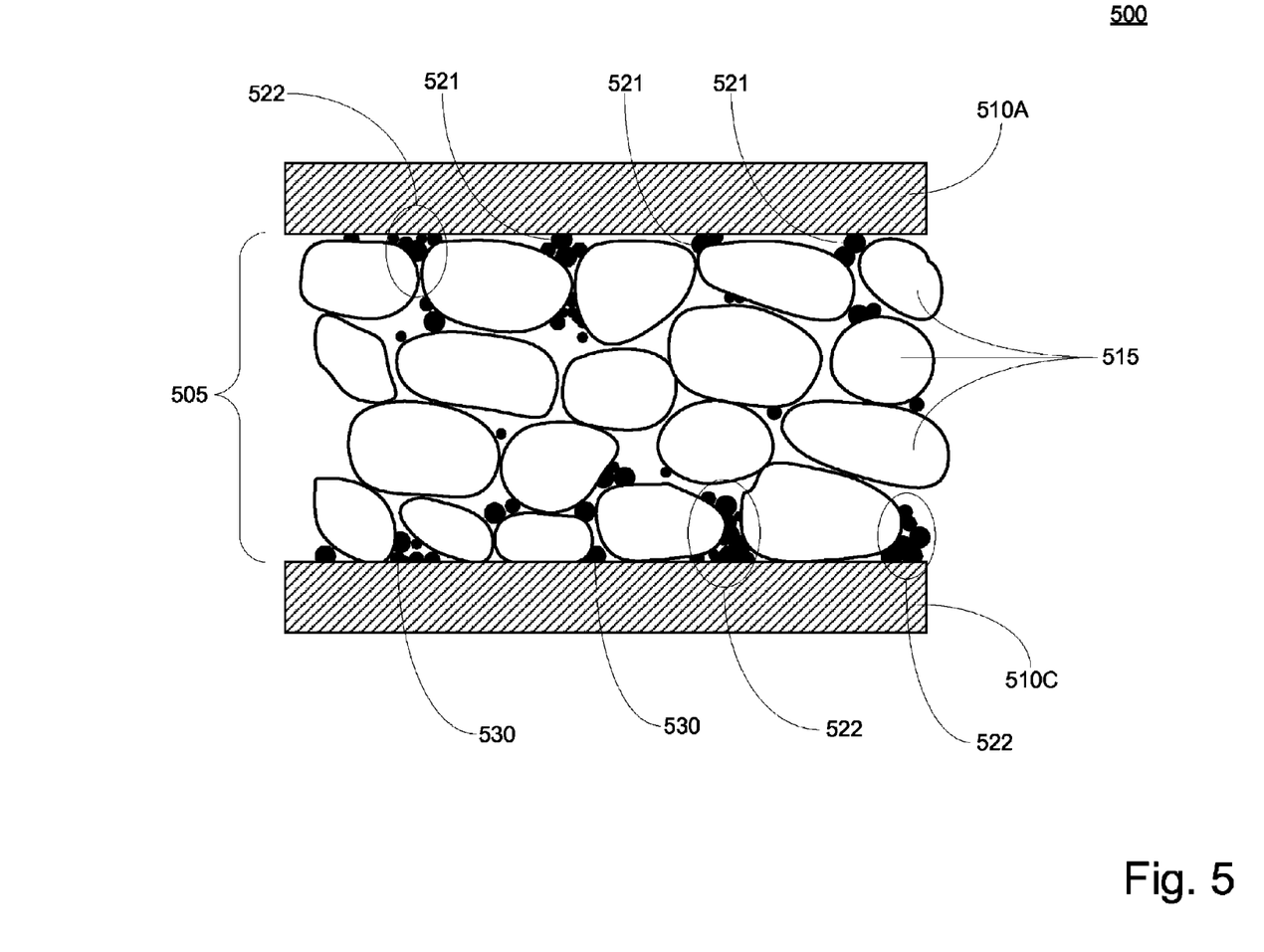
FIG. 5 illustrates a cross-sectional view of a single EDE tri-layer that may form another exemplary embodiment of a three-dimensional capacitor, wherein metal particles are impregnated into the dielectric green tape.

FIG. 5 illustrates a cross-sectional view of a single EDE tri-layer 500 that may form an exemplary embodiment of a three-dimensional capacitor, wherein metal particles 521 are impregnated into the dielectric green tape 215, 505. A metal powder containing fine particulate may be made into a slurry and applied to the surface of the dielectric green tape 215 described relative to process 100 such that the metal particles 521 are forced into voids between the dielectric particles 515. Similar to that which has been described relative to the FIG. 3 and FIG. 4 embodiments, it is envisioned that metal particulate 521 may be comprised of any suitable conductive material including, but not limited to, silver, silver palladium alloy, nickel, nickel alloys, copper, copper alloys, etc. As such, it will be understood that metal particulate material choices will occur to those with ordinary skill in the art and will not limit the scope of the disclosure.

Essentially, the application of the fine particle metal slurry causes the metal particles 521 to penetrate the "pores" of the dielectric tape 215, 505, thereby potentially aggregating to create protrusions 522 that form an interface 530 with plates 510A, 510C. Advantageously, any interfaced protrusions 522 may operate to effectively increase the surface area that is attributable to conductive plates 510A, 510C.

Referring back to process 100, an additional step may be added after step 110, and before screen printing step 120, such that the deposition of a slurry containing suitably fine-sized metal particulate 521 can be applied to the dielectric tape 215 before printing the electrode ink 510A, 510B in the electrode screen printing step 120.

Figure 6:
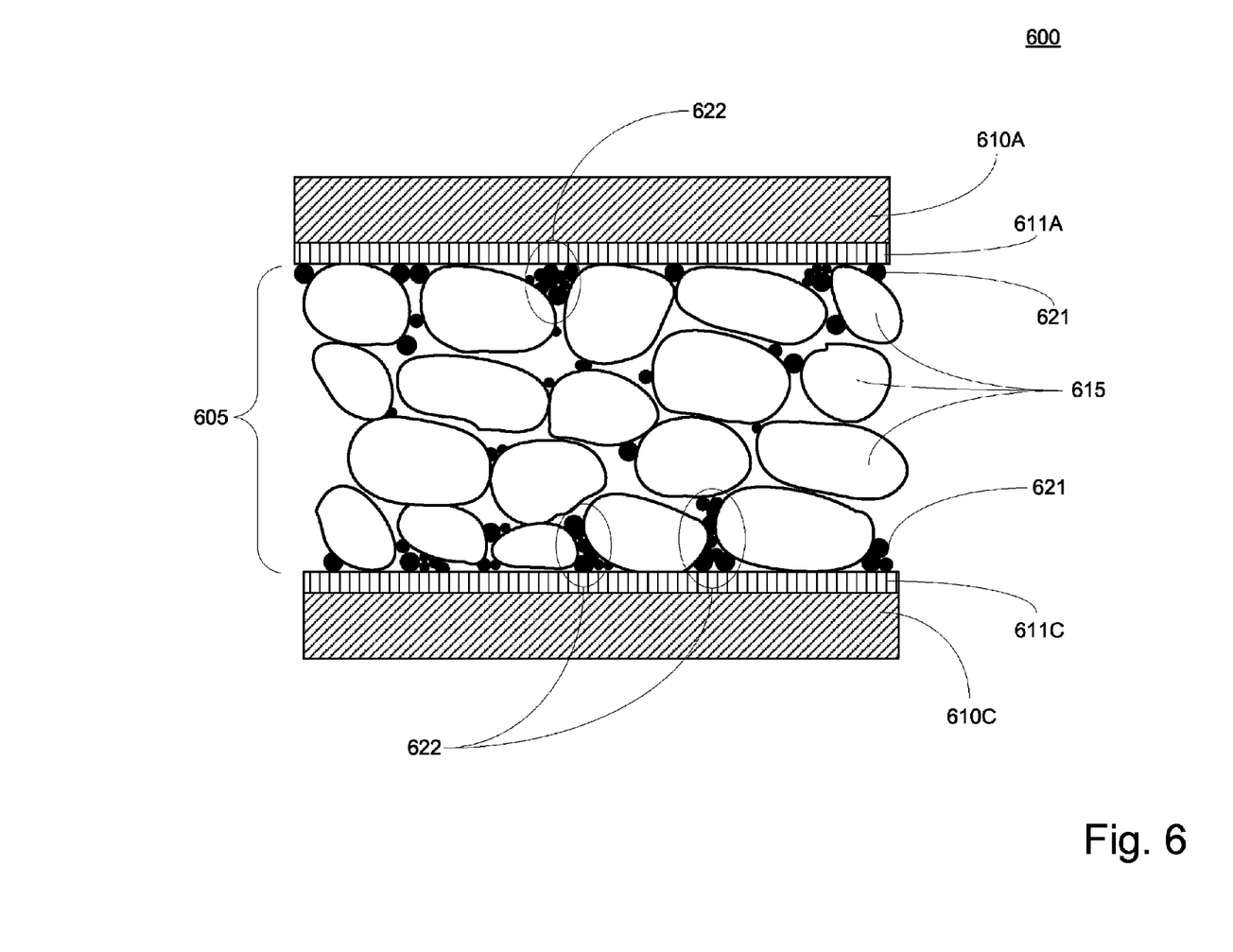
FIG. 6 illustrates a cross-sectional view of a single EDE tri-layer that may form another exemplary embodiment of a three-dimensional capacitor, wherein metal particles are impregnated into the dielectric green tape and the conductor plates comprise a layer of low melting point electrode material adjacent to the dielectric layer.

FIG. 6 illustrates a cross-sectional view of a single EDE tri-layer 600 that may form an exemplary embodiment of a three-dimensional capacitor, wherein metal particles 621 are impregnated into the dielectric green tape 215, 605 and the conductor plates comprise a layer of low melting point electrode material adjacent to the dielectric layer 605. Similar to the FIG. 5 embodiment, FIG. 6 illustrates an electrode structure formed by diffusion of a low melt point metal conductor 611A, 611C adjacent to the dielectric layer 605 (low melt point is relative to the melt point of the material used for the primary conductor plates 610A, 610C). For example, use of a 100% silver electrode 611A, 611C beneath an upper electrode layer 610A, 610C of about 95% Ag/5% Pd (silver/palladium alloy) may increase the metal flow into cavities between dielectric particulate 615 during sintering step 140, thereby creating three-dimensional structures or protrusions 622 in conjunction with optional impregnated metal particulate 621. Notably, while the FIG. 6 illustration depicts an embodiment comprising both low melt point conductor layers 611A, 611C and impregnated metal particulate 621, it will be understood that similar embodiments may not comprise the impregnated particulate 621 as the low melt point material may suitably generate conductive protrusions as it flows upon sintering into voids between the dielectric particulate 615.

Similar to that which has been described relative to the FIG. 3 and FIG. 4 embodiments, it is envisioned that metal particulate 621 may be comprised of any suitable conductive material including, but not limited to, silver, silver palladium alloy, nickel, nickel alloys, copper, copper alloys, etc. As such, it will be understood that metal particulate material choices will occur to those with ordinary skill in the art and will not limit the scope of the disclosure. Importantly, one of ordinary skill in the art will also recognize that similar embodiments to the exemplary FIG. 6 embodiment may call for the low melt point conductor layers to be positioned above the primary conductors such that the primary conductors are juxtaposed to the dielectric.

Referring back to process 100, an additional step may be added within screen printing step 120, such that the low melting electrode paste is printed in the same step but prior to the printing of the primary electrodes 610.

The exemplary embodiments of a three-dimensional capacitor, which have been described and depicted relative to FIGS. 3 through 6, utilize electrode layers comprised primarily of conductive particulate or rigid plates such as, but not limited to, silver, silver/palladium alloy, nickel, nickel alloys, copper or copper alloys. Other embodiments of a three-dimensional capacitor, however, utilize anode and cathode layers comprising metal coated, nonconductive material such as, but not limited to, silver coated ceramic particulate or any combination of conductive coating and nonconductive material. Moreover, in such embodiments that utilize metal coated, non conductive material for the conductive layers of a three-dimensional capacitor, the specific percent by weight in the conductive layer that is attributable to the nonconductive material or, alternatively, the conductive coating, may vary by embodiment and can range from about 1% to about 90%. Advantageously, such embodiments may realize a cost savings over traditional capacitor arrangements in addition to providing various benefits of three-dimensional structure.

Figure 7:
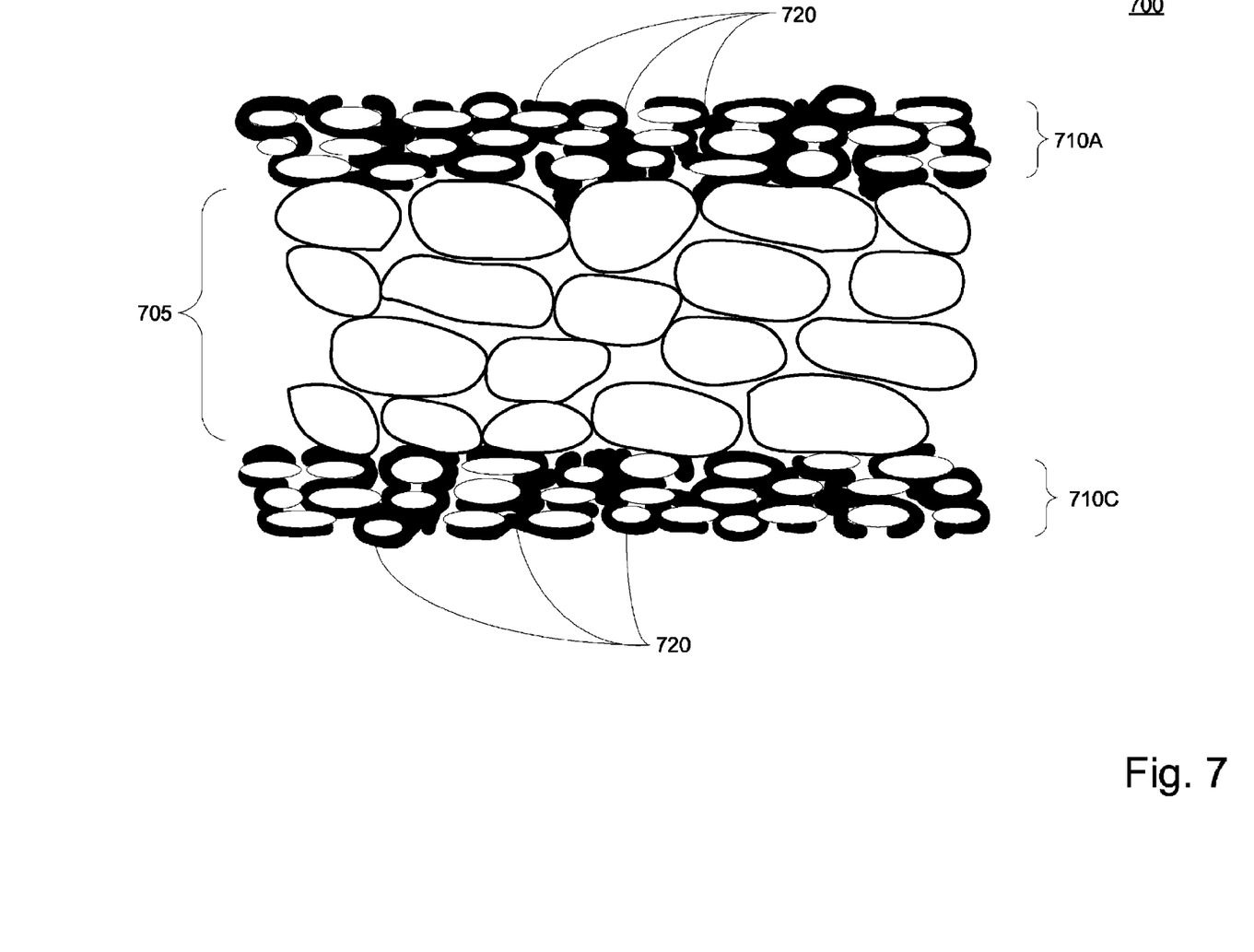
FIG. 7 illustrates a cross-sectional view of a single EDE tri-layer that may form another exemplary embodiment of a three-dimensional capacitor, wherein metal coated particulate are used to create the conductive layers between which a dielectric layer is sandwiched.

FIG. 7 illustrates a cross-sectional view of a single EDE tri-layer 700 that may form an exemplary embodiment of a three-dimensional capacitor, wherein metal coated particulate 720 is used to create the conductive layers 710A, 710C between which a dielectric layer 705 is sandwiched. In the exemplary FIG. 7 embodiment, electrode ink 225 applied over the green tape 705 at screen printing step 120 may comprise conductive coated particulate, such as, but not limited to, metal coated ceramic powder as well as any other particulate and coating combinations that may occur to one of ordinary skill in the art. Advantageously, upon exposure to sintering temperatures at step 140, a functional electrode layer 710 is formed from the ink when a three-dimensional metal network 720 results from the aggregation of the melted particulate coating in the electrode layers 710. Importantly, in some embodiments, the three-dimensional metal network 720 in the electrode layers 710 may also be achieved by mechanically mixing the electrode and dielectric.

Figure 8:
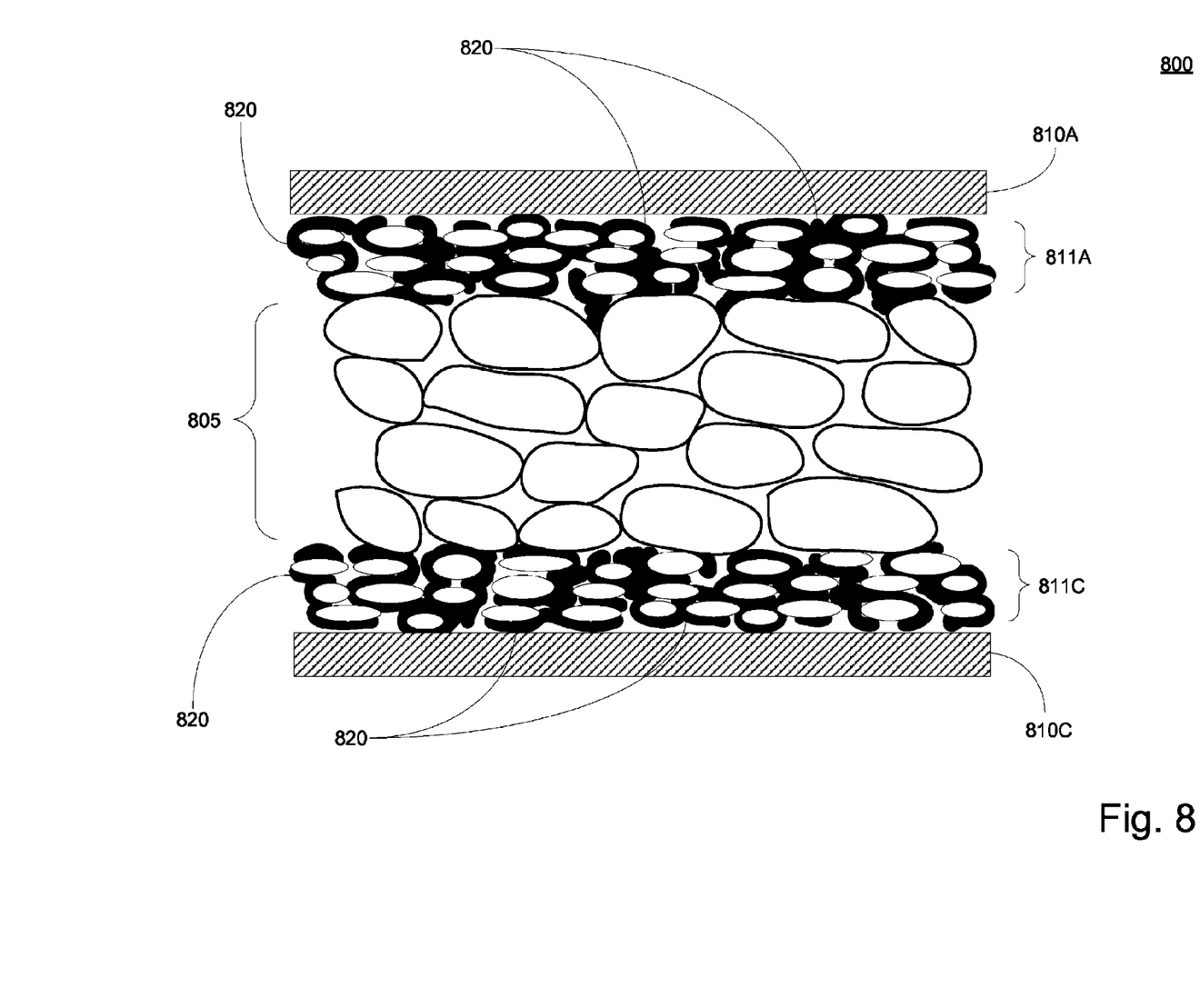
FIG. 8 illustrates a cross-sectional view of a single EDE tri-layer that may form another exemplary embodiment of a three-dimensional capacitor, wherein a metal coated ceramic layer is formed between the dielectric layer and the electrode layers.

FIG. 8 illustrates a cross-sectional view of a single EDE tri-layer 800 that may form an exemplary embodiment of a three-dimensional capacitor, wherein a metal coated ceramic layer 811A, 811C is formed between the dielectric layer 805 and the electrode layers 810A, 810C. The dielectric layer 805 in this exemplary embodiment may be formed from dielectric materials, such as, for example, standard uncoated ceramics. The metal-coated ceramic layer 811 forms a network 820 and is electrically connected to the respective electrode layers 810. Similar to the low melt point conductive layer described relative to the FIG. 6 embodiment of a three-dimensional capacitor, the metal-coated ceramic layers 811 can be printed at step 120 using ink containing metal-coated ceramic particles, prior to printing the standard electrodes 810A, 810C (alternatively, the standard electrode layer could be printed prior to the metal coated ceramic particulate layer in some embodiments).

The exemplary embodiments of a three-dimensional capacitor which have been described and depicted in FIGS. 3 through 8, are embodiments formed from the controlled flow of conductive coatings on dielectric particulate and/or impregnation of conductive particles.

Manufacturing Process with Mechanical Conversion Steps and/or Pre-Designed Plate Geometry Some embodiments of a three-dimensional capacitor have three-dimensional structures positioned substantially perpendicular to the dielectric layer by virtue of planned conductor/dielectric geometry and/or mechanical conversion techniques.

Figure 9:
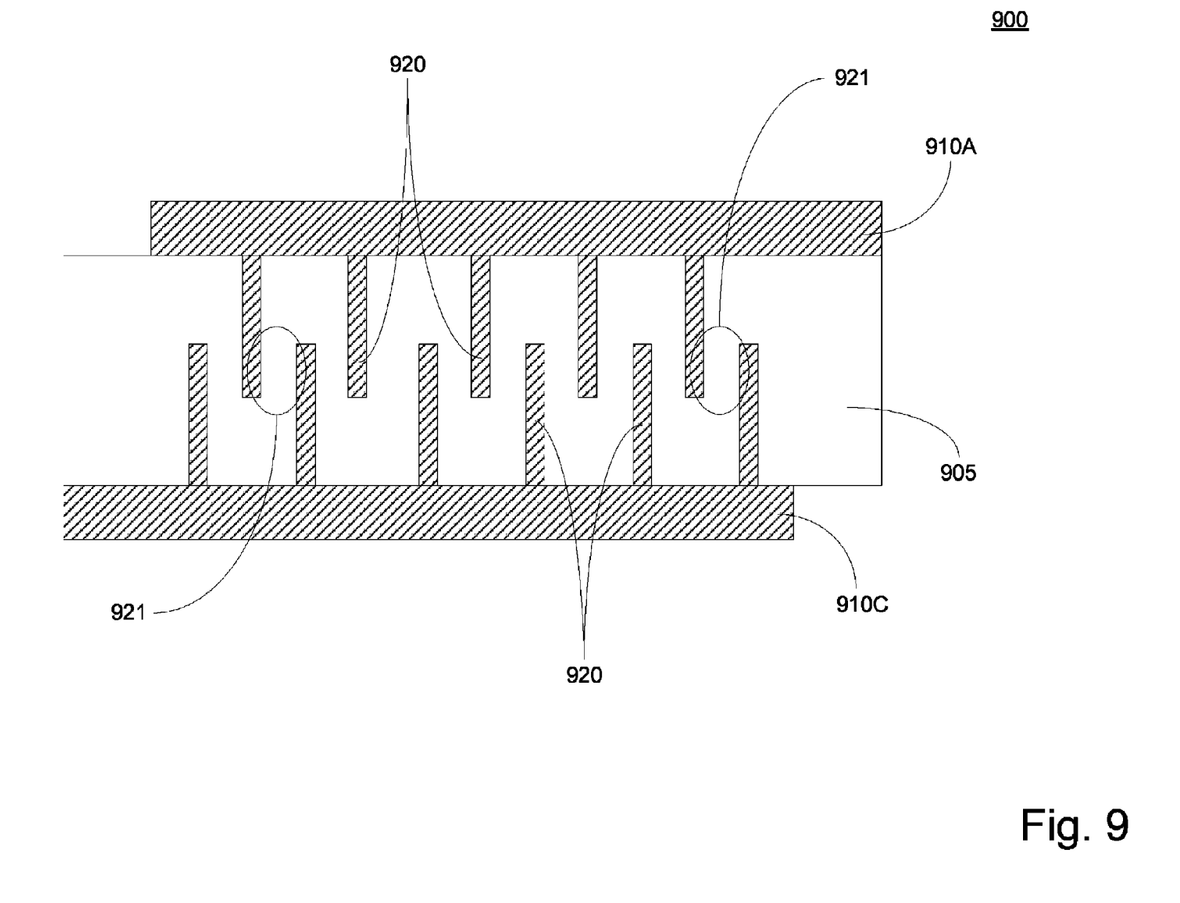
FIG. 9 illustrates a cross-sectional view of a single EDE tri-layer that may form another exemplary embodiment of a three-dimensional capacitor, wherein three-dimensional structures protrude perpendicularly from the primary conductor layers into the dielectric layer.

FIG. 9 illustrates a cross-sectional view of a single EDE tri-layer 900 that may form an exemplary embodiment of a three-dimensional capacitor, wherein three-dimensional structures (or protrusions) 920 protrude perpendicularly from the anode 910A and cathode 910C layers into the dielectric 905. Two electrodes 910 are separated by a dielectric layer 905. The dielectric layer 905 in the exemplary FIG. 9 embodiment may be formed from conventional dielectric materials, such as, but not limited to, standard uncoated ceramics, however it is envisioned that coated particulate similar to that which is described above may be used in various embodiments.

The "slots" or "bores" that accommodate the electrode protrusions 920 are created in dielectric 905 by any suitable mechanical device or boring method as understood by one of ordinary skill in the art. Substantially perpendicular, three-dimensional electrode extensions or finger-like protrusions 920 are then created by filling the slots with conductive material. Connected to their respective electrodes 910A, 910C, electrode protrusions 920 create additional capacitor arrangements within the main capacitor 900 at areas of overlap 921 between anode and cathode protrusion 920 pairs. Consistent with embodiments described above, the electrode extensions 920 work in conjunction with the primary electrode plates 910 to increase the effective surface area of the electrode layers and thusly improve the capacitance density of a capacitor that includes such a tri-layer 900.

In FIG. 9, the slots and corresponding electrode protrusions 920 are depicted as being perpendicular to the cross section. It should be understood, however, that the protrusions 920 can be parallel to the cross section to provide for electrode extensions 920 that are electrically connected to one of the primary conductor plates by virtue of edge metallization and termination techniques, even though such a layout is not shown. Suitable ways to create the slots may include, but are not limited to, laser drilling, mechanical punching, etc. Suitable ways to fill the slots to create electrode protrusions may include, but are not limited to, printing electrode ink over the dielectric tape to fill the slots or printing the dielectric ink to fill altering slots in order to insulate a given electrode 920 from a given conductor layer 910. It is envisioned that the patterning can also be accomplished via photolithographic techniques or imprint printing. Other methods for leveraging bores in the dielectric in order to generate a three-dimensional capacitor embodiment will occur to those with ordinary skill in the art and, as such, the particular exemplary embodiments depicted in the figures, and described herein, will not limit the scope of the disclosure as understood to one of ordinary skill in the art.

With regards to the exemplary embodiment depicted in FIG. 9, and similar embodiments, it should be apparent to one of ordinary skill that the pattern density, therefore, the capacitance, is limited by the resolution of the mechanical means to form the slots and the printing means to fill the slots.

Figure 10:
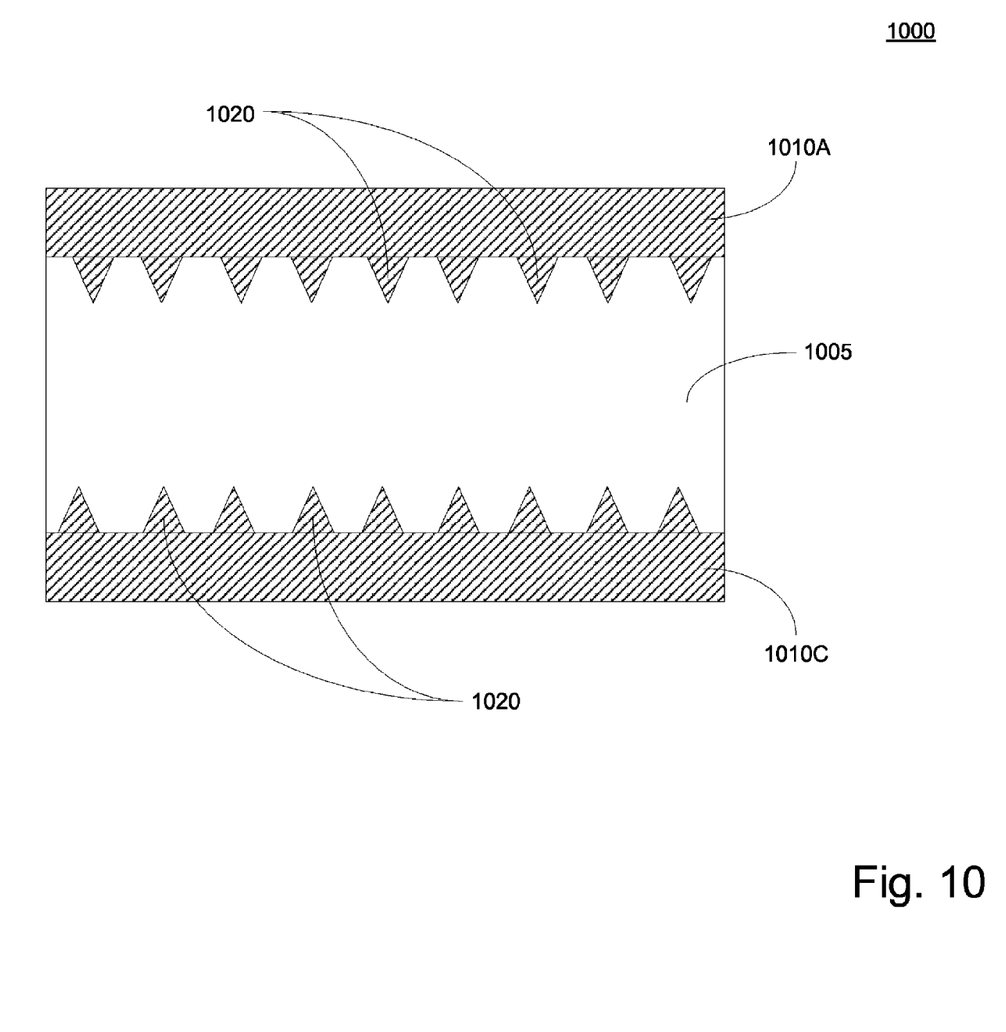
FIG. 10 illustrates a cross-sectional view of a single EDE tri-layer that may form another exemplary embodiment of a three-dimensional capacitor, wherein three-dimensional structures protrude from the primary conductor layers into the dielectric layer.

FIG. 10 illustrates a cross-sectional view of a single EDE tri-layer 1000 that may form an exemplary embodiment of a three-dimensional capacitor, wherein three-dimensional structures (or protrusions) 1020 protrude from the primary conductor layers into the dielectric layer 1005. Similar to previously described embodiments, the exemplary embodiment of FIG. 10 advantageously increases capacitance density via the increase of anode and cathode surface area that is coupled to the dielectric 1005. The electrode structures 1020 may be formed by patterning techniques such as, but not limited to, imprint printing, molding, etc. That is, the three-dimensional structures 1020 may be created in a modified green tape component via application (such as stamping) of a die with teeth to the dielectric green tape 215 prior to screen-printing the electrode layer 1010 at step 120 of exemplary process 100.

The dielectric layer 1005 in the exemplary FIG. 10 embodiment may be formed from conventional dielectric materials, such as standard uncoated ceramics, but such is not required in all embodiments. Upon screen printing the modified green tape, the electrodes 1010 acquire projections 1020 that are attributable to the exemplary teeth imprints that resulted from stamping or molding the green tape into the modified dielectric layer 1005. The projections 1020 may function as extended electrodes to effectively create additional surface area within the main capacitor 1000 for gathering electrical charge.

For manufacturing the exemplary embodiment of FIG. 10, and similar embodiments, modifications to the manufacturing process 100 may include adding texture to the dielectric tape after or during the "tape casting" step 110. Notably, one of ordinary skill will recognize that patterns for the projections 1020 other than those illustrated can be used in similar embodiments of a three-dimensional capacitor.

Certain steps in the processes or process flow described in this specification must naturally precede others for a given three-dimensional capacitor embodiment to function as described. However, the manufacture of a three-dimensional capacitor is not limited to the order of the steps described if such order or sequence does not alter the functionality of the three-dimensional capacitor resulting there from. That is, it is recognized that some steps may be performed before, after, or in parallel with other steps without departing from the scope and spirit of the disclosure. In some instances, certain steps can be deleted or not performed, without departing from the invention.

The three-dimensional capacitor as described above may comprise about 1 to about 1000 layers, preferably about 300 to about 500 layers, with dielectric layer thicknesses often being from about 1 to about 50 microns. When only a single layer of dielectric is utilized, a single layer capacitor is formed, often seen in the passive integration in low temperature co-fired ceramic (LTCC) technologies. The three-dimensional capacitor may also comprise as small as a 0402 size (about 0.04 inch by about 0.02 inch) and even a 0201 size (about 0.02 inch by about 0.01 inch).

The exemplary three-dimensional capacitor embodiments described above employ a so-called 'tape process' (as shown in FIG. 1-2). It is envisioned, however, that three-dimensional capacitor embodiments can also be made using the so-called 'wet process', in which the dielectric layer is actually printed using dielectric slurry.

A three-dimensional capacitor and methods of its manufacture have been described using detailed descriptions of embodiments thereof that are provided by way of example and are not intended to limit the scope of the disclosure. The described embodiments comprise different features, not all of which are required in all embodiments of a three-dimensional capacitor. Some embodiments of a three-dimensional capacitor utilize only some of the features or possible combinations of the features. Variations of embodiments of a three-dimensional capacitor and methods of its manufacture are included within the scope of the invention as understood to one of ordinary skill in the art.

It is envisioned that the systems, devices, methods and arrangements, or features or aspects thereof, disclosed herein in the context of MLCCs can be used in other related or analogous applications such as, but not limited to, ceramic and plastic polymer substrates for embedded passive component applications. Thus, one of ordinary skill in the art will recognize that disclosed embodiments, or variations thereof, can be incorporated into, among other applications, low-temperature co-fired ceramic (LTCC) applications, high-temperature co-fired ceramic (HTCC) applications, thick film hybrid circuits and printed circuit boards (PCB). Further, it is envisioned that disclosed embodiments, or variations thereof, can be employed in super-capacitors or super-capacitor applications, as electrode protrusions in a three-dimensional capacitor advantageously generate an increase in electrode surface area that may be desirable in super-conductors or super-conductor applications.

What is claimed is:

1. A method for manufacturing a capacitor having an increased capacitance density, the method comprising the steps of:
   mixing a powder comprised of dielectric particles into a dielectric slurry, wherein the dielectric particles are coated with a conductive coating;
   casting a dielectric tape from the dielectric slurry;
   applying a layer of ink over the dielectric tape to create a printed green sheet, wherein the ink is comprised of conductive particles which operate to form an electrode layer;
   stacking a plurality of printed green sheets such that the electrode layer of at least one sheet is juxtaposed to the dielectric tape layer of an adjacent sheet; and
   sintering the stacked printed green sheets such that the conductive coating on the dielectric particles aggregates in voids between the dielectric particles, wherein at least one instance of aggregation of the conductive coating is in electrical communication with an electrode layer.

2. The method of claim 1, wherein the powder mixed to form the dielectric slurry further comprises conductive particulate.

3. The method of claim 2, wherein the conductive particulate is comprised of material selected from the group consisting of silver, silver palladium alloy, nickel, nickel alloy, palladium, palladium alloy, platinum, platinum alloy, silver, silver alloy, gold, gold alloy, iridium, Rhodium, ruthenium, copper, nickel, iron, cobalt, manganese, titanium, zinc, tungsten, molybdenum, zirconium, tantalum, and niobium.

4. The method of claim 1, further comprising the step of:
applying a second layer of conductive ink over the dielectric tape in the forming of the electrode layer, wherein the second layer of ink is comprised of conductive material which has a melting point lower than the melting point of the material comprised within the first layer of conductive ink.

\* \* \* \* \*